United States Patent [19]

Shikimori et al.

[11] Patent Number: 5,560,266
[45] Date of Patent: Oct. 1, 1996

[54] MECHANISM FOR DRIVING A TRANSPORTING DEVICE HAVING FRAME

[75] Inventors: Seiji Shikimori; Jeroen N. M. Kuijpers, both of Uithoorn, Netherlands

[73] Assignee: Yamaha Motor Europe, N.V., ZN Schiphol, Netherlands

[21] Appl. No.: 197,606

[22] Filed: Feb. 17, 1994

[30] Foreign Application Priority Data

Feb. 22, 1993 [NL] Netherlands .............. 9300321

[51] Int. Cl.⁶ ............................................ G05G 1/14
[52] U.S. Cl. ...................... 74/594.1; 180/205; 180/220
[58] Field of Search ........................ 74/594.1, 594.2, 74/813 C; 180/205–207, 220, 65.1

[56] References Cited

U.S. PATENT DOCUMENTS

| | | | |
|---|---|---|---|
| 4,062,421 | 12/1977 | Weber | 180/65 |
| 4,122,907 | 10/1978 | Davidson et al. | 180/206 |
| 4,221,275 | 9/1980 | Pennebaker et al. | 180/206 |
| 4,364,448 | 12/1982 | Ikuma | 180/206 |
| 4,380,180 | 4/1983 | Foote et al. | 74/813 C |
| 4,541,500 | 9/1985 | Gelhard | 180/205 |
| 4,662,644 | 5/1987 | Nelson | 180/205 X |
| 5,024,286 | 6/1991 | Lean et al. | 180/206 |
| 5,226,501 | 7/1993 | Takata | 180/206 |
| 5,242,028 | 9/1993 | Murphy et al. | 180/205 X |
| 5,368,122 | 11/1994 | Chou | 180/205 X |
| 5,370,200 | 12/1994 | Takata | 180/206 |

FOREIGN PATENT DOCUMENTS

| | | |
|---|---|---|
| 0079573 | 5/1983 | European Pat. Off. . |
| 0517224 | 12/1992 | European Pat. Off. . |
| 2354235 | 1/1978 | France . |
| 668191 | 3/1952 | United Kingdom ........... 180/205 |

*Primary Examiner*—Vinh T. Luong
*Attorney, Agent, or Firm*—Roylance, Abrams, Berdo & Goodman, L.L.P.

[57] ABSTRACT

A mechanism for driving a transporting device having a frame by at least one of human force and a mechanical driving source, comprises a first part (2, 4, 5) rotated relative to the frame by human force and a second part (17 or 18) rotated relative to the frame by driving the mechanical driving source. An outer ring (13), an inner ring (8) and spoke members (11, 12) are integrally formed with a resiliently deformable material so as to connect the first part and the second part. A first permanent magnet (23) and a second permanent magnet (24) are provided on the outer ring, in such a manner that reed switches provided on the frame senses the angular displacement between the first magnet (23) and the second magnet (24) and each revolution of the first magnet (24) and the second magnet (23). The mechanical driving source in response to the signals which relate to the revolutions and angular displacement and are generated by the reed sensors, are controlled by a controller.

10 Claims, 3 Drawing Sheets

5,560,266

MECHANISM FOR DRIVING A TRANSPORTING DEVICE HAVING FRAME

BACKGROUND OF THE INVENTION

The invention relates to a mechanism for driving a transporting device comprising a frame by human force and/or with a mechanical driving source, whereby a part to be rotated by human force is coupled, by resiliently deformable member, to a driven part, which is to be rotated so as to drive the transporting device, whilst monitoring member are provided for determining the angular displacement between the two parts, with a view to influencing the mechanical driving source through control member.

Such a mechanism is described in U.S. Pat. No. 5,024,286, more in particular used in a bicycle equipped with an auxiliary motor. Although the present application also describes an embodiment wherein the mechanism is used in a motor-assisted bicycle, it will be apparent that the mechanism according to the invention can also be used in other vehicles and/or craft, for example in a motor-assisted pedal boat.

The bicycle known from U.S. Pat. No. 5,024,286 has two discs extending parallel to each other and being provided with openings at their circumference, the discs being used for determining the angle of displacement between the part rotated by human force and the part being driven. In the unloaded position of the parts the openings in the one discs are covered by parts of the other disc. During operation the discs will generally rotate more or less with respect to each other, as a result of which the aperture parts of the discs will overlap each other to a larger or smaller extent. An optical sensor is used for detecting the extent to which the aperture parts of the discs overlap as well as the passage of the overlapping openings, in order to generate signals for influencing the control member of the mechanical driving source, all this as explained in the above-mentioned U.S. Pat. No. 5,024,286, the contents of which are incorporated herein by reference.

Although the device may be satisfactory per se, the fact that the use of an optical sensor requires power constitutes a drawback, whilst such a mechanism is furthermore highly sensitive to fouling of the optical sensor.

SUMMARY OF THE INVENTION

Accordingly the object of the invention is to obtain a mechanism of the above kind, which has a simple, efficient construction and which can operate in a reliable manner.

According to the invention this can be achieved in that a permanent magnet is connected to the part to be rotated by human force as well as to the driven part which is rotated, and that sensors are provided on the frame in such a manner that with each revolution of the rotatable parts the sensors detect the passage of a respective magnet, so as to generate signals influencing the control member.

Preferably so-called reed sensors will be used, which are opened or closed upon passage of the magnet.

According to a further aspect of the invention a particularly efficient connection between the part to be rotated by human force and the driven part can be made when both parts are connected by a connecting mechanism which is provided with two rings concentrically surrounding each other, one of the rings being connected to the one part and the other ring being connected to the other part, whilst the two rings are interconnected by spokes made of a resilient material.

According to a furthermore aspect of the invention, provided is a mechanism for driving a transporting device having a frame by at least one of human force and a mechanical driving source, comprising: a first part rotated relative to the frame by human force; a second part rotated relative to the frame by being driven by the mechanical driving source; means, at least part of which is made of a resiliently deformable material, for resiliently connecting the first part and the second part, the connecting means having a first sensed member made of a first material which is different from the resiliently deformable material in a magnetic characteristic and a second sensed member made of a second material which is different from the resiliently deformable material in a magnetic characteristic; sensor means provided on the frame for sensing the angular displacement between the first sensed member and the second sensed member and each revolution of the first sensed member and the second sensed member, the sensor means generating signals relating to the angular displacement and the revolutions; and controlling means for controlling the mechanical driving source in response to the signals generated by the sensor means.

In the mechanism according to the furthermore aspect of the present invention, the first and second material may be a permanent magnet, and the sensing means may comprises a plurality of reed sensors which are operated by the first and second sensed members.

In this way a construction of simple design is obtained, by means of which a comparatively great deal of power can be transmitted.

BRIEF DESCRIPTION OF THE PREFERRED EMBODIMENTS

FIG. 1 shows a sprocket wheel of a bicycle with parts associated therewith, partly in elevation and partly in section;

FIG. 2 a side view of FIG. 1, partly in elevation and partly in section, along the line II;

DETAILED DESCRIPTION OF THE PREFERRED EMBODIMENTS

The invention will be explained in more detail hereafter with reference to a possible embodiment of the construction according to the invention diagrammatically illustrated in the accompanying Figures.

Figure 4:
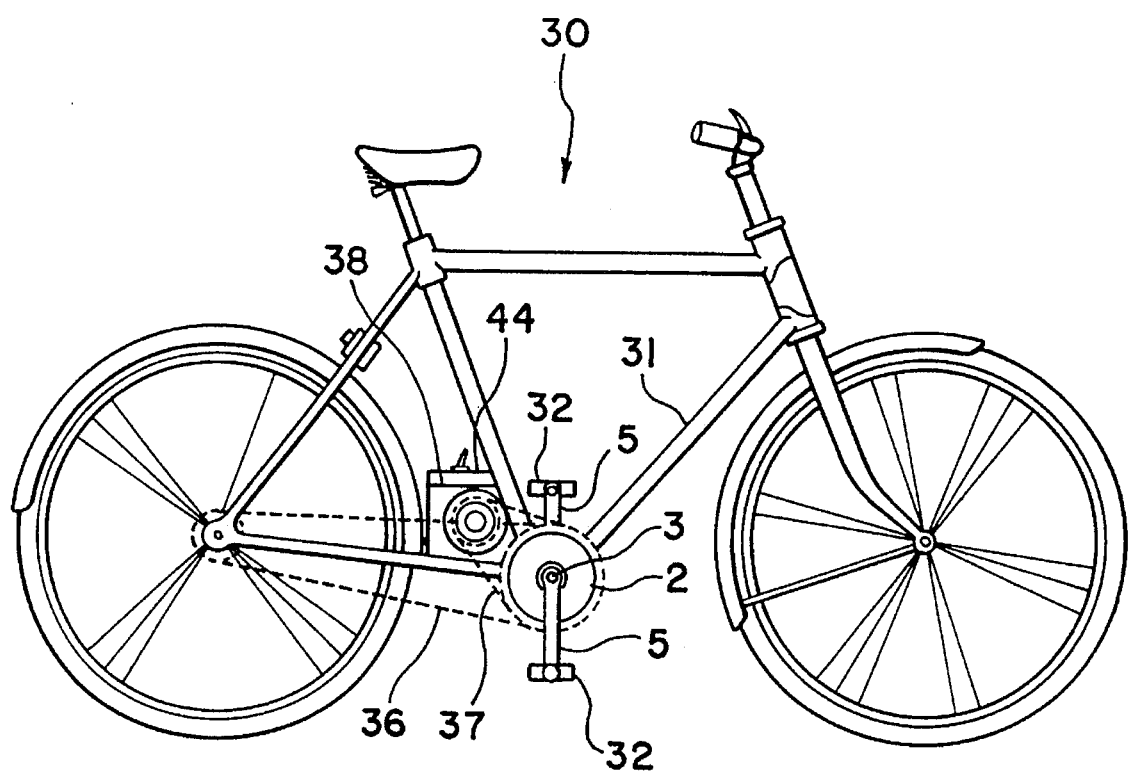
FIG. 4 is a schematic elevational view of a typical bicycle in which the present invention is installed thereon.

The present invention is designed to be installed on a transporting device such as a bicycle 30 which is shown in Figure 4. The transporting device or bicycle 30 has a frame 31 for supporting the mechanism of the present invention, and a mechanical driving source or motor 38 for driving the mechanism of the present invention.

As is illustrated in the Figures, a disc-shaped member 2 is fixed to a crankshaft 1 by a hub 4 of the disc-shaped member 2, which is clamped down on the crankshaft 1 by a bolt 3. A pair of usual cranks 5 on whose free ends pedals 32 are pivotally mounted in the usual manner, is fixedly connected to the disc-shaped member 2. It will be apparent, therefore, that the crankshaft 1 with the disc-shaped member 2 can be rotated about the axis of rotation of the crankshaft 1 in the usual manner with respect to the frame 31 of the bicycle 30 or other vehicle, in which the crankshaft will be journalled so as to be rotatable about its axis.

An annular member 8 of L-shaped section is fixed to the hub 1 by screws 7, whereby, as will be apparent from the Figures, one leg 9 of the annular member 8 abuts against one end of the hub 4 and the other leg 10 of the annular member 8 tightly surrounds part of the outer periphery of the hub 4.

Figure 2:
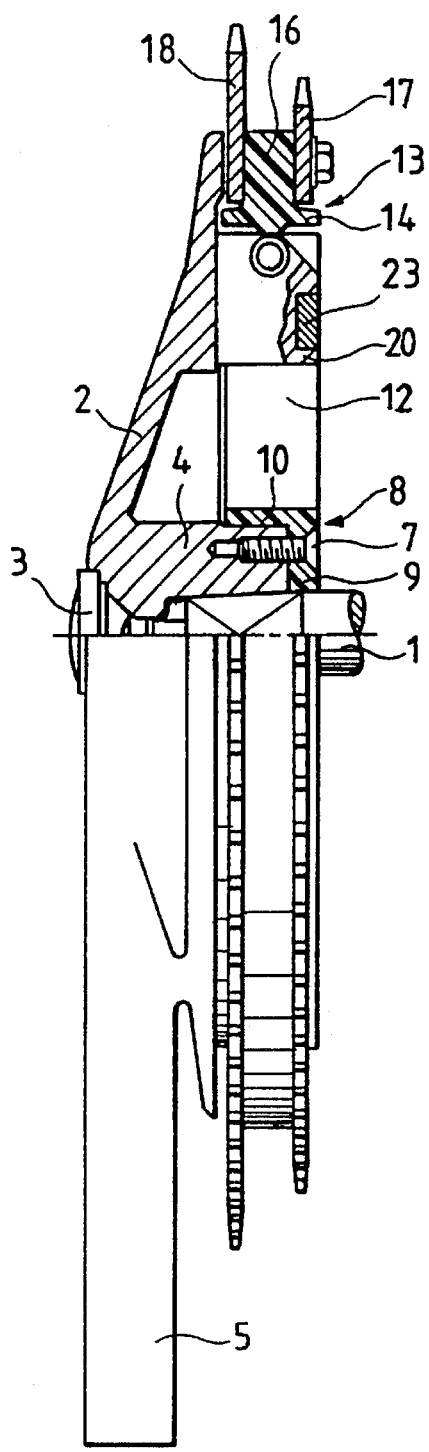
Figure 3:
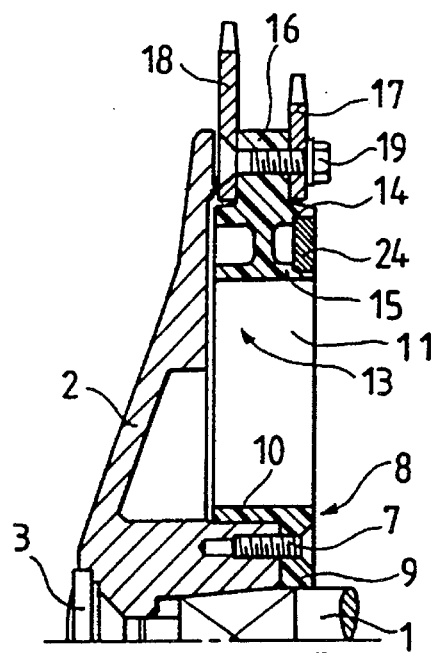
FIG. 3 is a sectional view, along the line III, of a part of FIG. 1.

Connected to the outer periphery of the leg 10 are the ends of spokes arranged in ten regularly spaced groups, each group comprising two spokes 11 and 12. The outer ends of the spokes 11 and 12 are connected to an annular member 13 concentrically surrounding the annular member 8, and more in particular to cams 15 projecting in the direction of the annular member 8 with respect to the annular flange 14 of the annular member 13. As is furthermore apparent in particular from FIGS. 2 and 3, a circular rib 16 is provided on the outside of the circular flange 14, on which two sprocket wheels 17 and 18 are clamped down by bolts 19.

Figure 1:
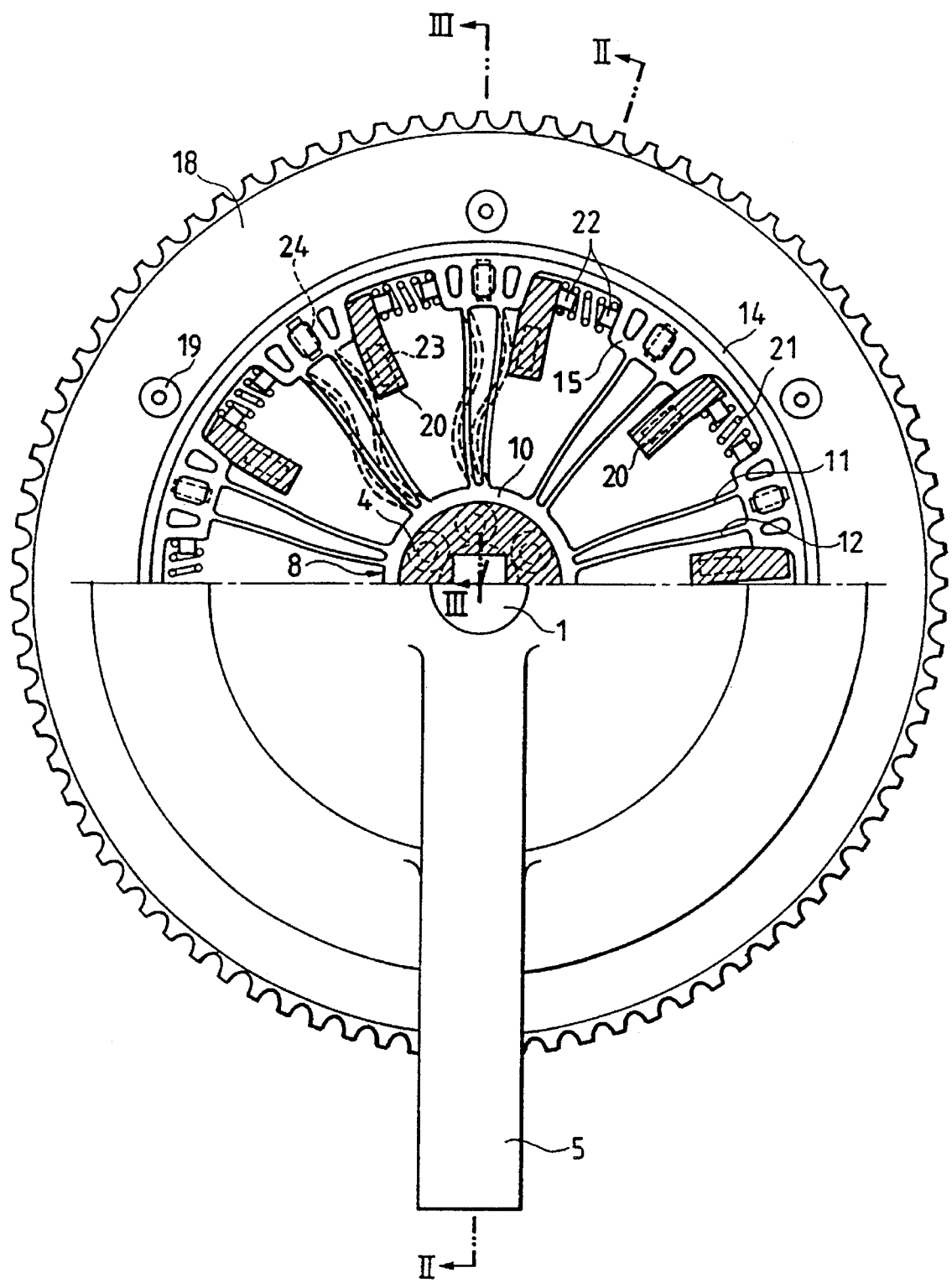

The connecting mechanism or means connecting the sprocket wheels 17 and 18 to the hub 4 and the disc-shaped members 2, which is comprised of the two annular members 8 and 13 and the spokes 11, 12 connecting the annular members, is preferably integrally formed of plastic material. As is apparent from the Figures thereby, the spokes have a slightly W-shaped or curved shaped configuration in its rest position as seen in full lines in FIG. 1. As the sprocket wheels 17 and 18 are rotated, the spokes 11 and 12 will resiliently deform such that the S-shape or curved shape of the spokes 11 and 12 become more pronounced. This resilient deformation of the spokes 11 and 12 are schematically illustrated in dotted lines in FIG. 1. The spacing between the ends of the spokes 11 and 12 joining the annular member 8 is smaller than the spacing between the ends of the same spokes 11 and 12 joining the annular member 13.

As is furthermore apparent the spokes of the illustrated preferred embodiment have a substantially rectangular section, whereby the longitudinal side of the rectangle extends at least substantially parallel to the central axis of the crankshaft 1.

As is furthermore illustrated in the Figures the disc-shaped member is provided with projecting noses 20 being integral with the disc-shaped member, in such a manner that each nose is located between a pair of projecting cams 15 of the annular member 13.

In the illustrated rest position of the parts each nose 20 abuts against one side of a cam 15, whilst a compression spring, a coil spring 21 in this embodiment, is provided between the nose 20 and the opposite cam 15. The spring is thereby retained in position by pins 22 surrounded by the coil spring 21, which are secured to the nose 20 and to the cam 15 respectively.

Each of the cams 20 houses a permanent magnet 23, whilst each of the cams 15 accommodates a permanent magnet 24. The distance between the central axis of the crankshaft 1 and the permanent magnets 23 is different from the distance between the central axis of the crankshaft and the permanent magnets 24. In the present case the permanent magnets 24 are located further away from the central axis of the crankshaft than the permanent magnets 23.

Assuming that the mechanism described above and illustrated in the Figures is incorporated in a bicycle 30 as saw in FIG. 4, one of the sprocket wheels 17 or 18 will be connected, by a chain 36, to a sprocket wheel mounted on a bicycle wheel, whilst the other sprocket wheel will be connected by a chain 37 to a sprocket wheel mounted on the outgoing shaft of an auxiliary motor 38 or the like.

When using a transporting device or bicycle 30 equipped with the above-described mechanism, the user of the transporting device will be able to rotate the part consisting of the hub 4 and the disc-shaped member 2 via the cranks 5 by human force. The part rotated by human force will thereby rotationally drive the annular member 13 with the sprocket wheels 17 and 18 mounted thereon via the springs 21 and the spokes 11 and 12, the sprocket wheels constituting a driven part to be rotated for driving the transporting device.

Upon rotation of these parts the above-described permanent magnets 23 and 24 will also be rotated, of course. Sensors 40, which are diagrommatically illustrated in FIG. 4 as being provided on the frame 31, preferably so-called reed switches, which will be opened or closed upon passage of a magnet, dependent on their design and/or arrangement, may in the first place be used to establish the passage of the magnets 23, 24 and thus determine the number of revolutions of the parts carrying the magnets in question.

In addition to that a certain angular displacement may occur by deformation of the springs 21 and the spokes 11 and 12 (dotted lines), dependent on the forces exerted on the pedals and the power to be transmitted via the driven part 13, 17, 18, whereby, measured in circumferential direction, the distance between the permanent magnets 23 and 24 will change. This relative rotary motion is limited by the pins 22 touching each other at a certain point. Also the distance or the variation in this distance respectively will be detected during the rotation of the members 2 and 13 by the sensors or provided on the frame. Thus the sensors may generate signals, which provide an indication of the number of revolutions of the rotating parts and of the angular displacement between the two parts, and thus of the force exerted by the user of the vehicle. This information may be used, for example in the manner described in the U.S. Pat. No. 5,024,286, to influence an auxiliary motor 38 or the like driving source for driving the vehicle. In other words, the signals generated by sensors are received by a control box or controlling mechanism 44 for controlling the auxiliary motor 38, i.e. the mechanical driving source. The operation of the auxiliary motor 38 by control box 44 is explained in more detail in U.S. Pat. No. 5,024,286.

It will be apparent that by using permanent magnets and switch(es) to be influenced by the magnetic field a reliable detecting mechanism of simple design are obtained, which do not require the supply of electric energy or the like for their operation. The connecting mechanism preferably made of plastic material, provided between the two parts, which is built up of two annular means 8 and 13 concentrically surrounding each other and the spokes 11, 12 provided therebetween, can furthermore be produced and mounted in a simple manner interconnecting the two parts, whilst allowing a relative rotation of the two parts with respect to each other.

While the invention has been described in detail and with reference to specific examples thereof, it will be apparent to one skilled in the art that various changes and modifications can be made therein without departing from the spirit and scope thereof.

What is claimed is:

1. A mechanism adapted to be coupled to a transporting device having a frame and a mechanical driving source, comprising:

a first part adapted to be coupled to said frame for rotation relative to said frame by human force;

a second part adapted to be coupled to said frame for rotation relative to said frame by said mechanical driving source, said first and second parts being adapted to rotate about a common axis;

an at least partially resilient connecting means for resiliently connecting said first part and said second part together for angular circumferential displacement about said common axis, said connecting means having a first sensed member made of a first magnetic material coupled to said second part for rotation therewith coupled to said first part for rotation therewith;

sensor means, adapted to be coupled to said frame, for sensing the angular circumferential displacement between said first sensed member and said second sensed member and each revolution of said first sensed member and said second sensed member relative to said frame, said sensor means generating signals relating to said angular displacement and said revolutions during rotation of said first and second parts; and a controlling mechanism coupled to the mechanical driving source and said sensor means for controlling the mechanical driving source in response to the signals generated by said sensor means.

2. A mechanism according to claim 1, in which said first and second magnetic materials are permanent magnets, and said sensor means comprises a plurality of reed sensors which are operated by said first and second sensed members.

3. A mechanism according to claim 1, in which said first sensed member includes a plurality of first magnets arranged circumferentially in regularly spaced-apart relationship, and said second sensed member includes a plurality of second magnets arranged circumferentially in regularly spaced-apart relationship.

4. A mechanism adapted to be coupled to a transporting device having a frame and a mechanical driving source, comprising:

a first part adapted to be coupled to said frame for rotation relative to said frame by human force;

a second part adapted to be coupled to said frame for rotation relative to said frame by said mechanical driving source;

an at least partially resilient connecting means for resiliently connecting said first part and said second part together, said connecting means having a first sensed member being made of a first magnetic material and a second sensed member being made of a second magnetic material;

sensor means, adapted to be coupled to said frame for sensing angular displacement between said first sensed member and said second sensed member and each revolution of said first sensed member and said second sensed member, said sensor means generating signals relating to said angular displacement and said revolutions during rotation of said first and second parts; and a controlling mechanism coupled to the mechanical driving source and said sensor means for controlling the mechanical driving source in response to the signals generated by said sensor means;

said first sensed member being disposed at a larger distance from the common axis of rotation of the first part and second part than said second sensed member.

5. A mechanism adapted to be coupled to a transporting device having a frame and a mechanical driving source, comprising:

a first part adapted to be coupled to said frame for rotation relative to said frame by human force;

a second part adapted to be coupled to said frame for rotation relative to said frame by said mechanical driving source;

an at least partially resilient connecting means for resiliently connecting said first part and said second part together, said connecting means having a first sensed member being made of a first magnetic material and a second sensed member being made of a second magnetic material; said connecting means further having an inner ring being connected to said first part, an outer ring being connected to said second part, said outer ring being concentrically surrounding said inner ring, and spoke members being made of a resilient material for interconnecting said inner ring and said outer ring together, sensor means, adapted to be coupled to said frame for sensing angular displacement between said first sensed member and said second sensed member and each revolution of said first sensed member and said second sensed member, said sensor means generating signals relating to said angular displacement and said revolutions during rotation of said first and second parts; and a controlling mechanism coupled to the mechanical driving source and said sensor means for controlling the mechanical driving source in response to the signals generated by said sensor means.

6. A mechanism according to claim 5, in which said inner and outer rings and said spoke members are integrally formed of a plastic material.

7. A mechanism according to claim 5, in which said spoke members are curved.

8. A mechanism according to claim 5, in which said spoke members have a rectangular cross-section in the axial direction of rotation, wherein the longitudinal side of said rectangular section extends transverse to the direction of rotation of said first and second parts.

9. A mechanism according to claim 5, in which said connecting means further comprises:

cam portions formed on said outer ring so as to be inwardly projected in the radial direction of the rotation of said first and second parts;

nose portions formed on said first part with each of said nose portions abutting against one side of each of said cam portions, said nose portions being located between a pair of said cam portions; and cam springs provided between said nose portions and said cam portions for pushing said nose portions and said cam portions in a direction away from each other.

10. A mechanism according to claim according to claim 9 wherein said first sensed member is provided with said cam portions, and said second sensed member is provided within said nose portions.

* * * * *